(12) United States Patent
Wu et al.

(10) Patent No.: US 11,023,389 B2
(45) Date of Patent: Jun. 1, 2021

(54) HUB DEVICE, DISPLAY DEVICE AND OPERATION METHOD THEREOF

(71) Applicant: Wistron Corp., New Taipei (TW)

(72) Inventors: Hsiang Chia Wu, New Taipei (TW); Guan Wei Pan, New Taipei (TW)

(73) Assignee: WISTRON CORP., New Taipei (TW)

( * ) Notice: Subject to any disclaimer, the term of this patent is extended or adjusted under 35 U.S.C. 154(b) by 0 days.

(21) Appl. No.: 16/542,093

(22) Filed: Aug. 15, 2019

(65) Prior Publication Data
US 2020/0364161 A1 Nov. 19, 2020

(30) Foreign Application Priority Data
May 15, 2019 (TW) .................................. 108116652

(51) Int. Cl.
| | |
|---|---|
| *G06F 13/10* | (2006.01) |
| *G06F 3/14* | (2006.01) |
| *G06F 13/40* | (2006.01) |
| *G06F 13/42* | (2006.01) |
| *G06F 3/0354* | (2013.01) |
| *G06F 3/041* | (2006.01) |
| *G06F 3/023* | (2006.01) |

(52) U.S. Cl.
CPC .............. *G06F 13/107* (2013.01); *G06F 3/14* (2013.01); *G06F 13/4027* (2013.01); *G06F 13/4282* (2013.01); *G06F 3/023* (2013.01); *G06F 3/03543* (2013.01); *G06F 3/041* (2013.01); *G06F 2213/0042* (2013.01)

(58) Field of Classification Search
CPC ...... G06F 13/107; G06F 3/14; G06F 13/4027; G06F 13/4282; G06F 3/023; G06F 3/03543; G06F 3/041; G06F 2213/0042
See application file for complete search history.

(56) References Cited

U.S. PATENT DOCUMENTS

| | | | |
|---|---|---|---|
| 6,532,512 B1 | 3/2003 | Torii et al. | |
| 10,142,581 B2 | 11/2018 | Lee | |
| 2010/0180055 A1 | 7/2010 | Lyon et al. | |
| 2012/0081305 A1* | 4/2012 | Schrock | G06F 3/04817 345/173 |
| 2018/0225230 A1* | 8/2018 | Litichever | G06F 21/82 |

FOREIGN PATENT DOCUMENTS

| | | |
|---|---|---|
| TW | M501591 U | 5/2015 |
| TW | M575142 U | 3/2019 |

\* cited by examiner

*Primary Examiner* — Charles V Hicks

(57) ABSTRACT

A hub device includes first and second upstream ports, a first bridge, and first and second downstream ports. The first and second upstream ports are connected to a first host and a second host. The first bridge is connected to the second upstream port. The first downstream port is connected to the first bridge and the first upstream port. The second downstream port is connected to the first upstream port and an input device. The first host generates a first operation result according to the input operation of the input device on the first display area. The first host transmits a first indication signal to the second host through the first bridge according to the input operation of the input device on a second display area, so that the second host emulates the input operation on the second display area to generate a second operation result.

20 Claims, 11 Drawing Sheets

(A)

↓

Using a control device to connect to the hub device, the first host, the second host and the third host, and setting, by the control device, a first display area corresponding to the first host, a second display area corresponding to the second host and a third display area corresponding to a third host to generate a setting message

S708

↓

Using a display panel to connect to the control device, so as to display the first display area, the second display area and the third display area

S710

↓

Receiving the setting message at the first host through the hub device, so as to obtain the display setting relationship of the first display area, the second display area and the third display area

S712

↓

Generating, by the first host, a first display result on the first display area according to the input operation of the input device on the first display area

S518

↓

Transmitting, by the first host, a first indication signal to the second host through the first bridge according to the input operation of the input device on the second display area, so that the second host emulates the input operation on the second display area according to the first indication signal to generate a second operation result on the second display area

S520

↓

Transmitting, by the first host, a second indication signal to the second host through the second bridge according to the input operation of the input device on the third display area, so that the third host emulates the input operation on the third display area according to the second indication signal to generate a third operation result on the third display area

HUB DEVICE, DISPLAY DEVICE AND OPERATION METHOD THEREOF

CROSS REFERENCE TO RELATED APPLICATIONS

This application claims priority of Taiwan Patent Application No. 108116652, filed on May 15, 2019, the entirety of which is incorporated by reference herein.

BACKGROUND OF THE INVENTION

Field of the Invention

An embodiment of the present invention relates to a hub device, a display device and an operation method thereof.

Description of the Related Art

With the advancement of display technology, the functionality of the display is also diversified. The technology of picture by picture (PBP) is a display mode of displaying images of different signal sources on the same display in parallel. For example, the images of two computers are displayed on the same display.

However, the input operations (such as those that use keyboards or mouses) of the two computers are still separate. The user still needs to switch the keyboards and the mouses of the device to operate the different computers, thereby causing inconvenience of use. Therefore, the design of the above structure still needs to be improved.

BRIEF SUMMARY OF THE INVENTION

An embodiment of the present invention provides a hub device, a display device and an operation method thereof, so that a plurality of hosts may share the same input device, so as to increase the convenience of use.

An embodiment of the present invention provides a hub device, which includes a first upstream port, a second upstream port, a first bridge, a first downstream port and a second downstream port. The first upstream port is connected to a first host, wherein the first host corresponds to a first display area. The second upstream port is connected to a second host, wherein the second host corresponds to a second display area. The first bridge is connected to the second upstream port. The first downstream port is connected to the first bridge and the first upstream port. The second downstream port is connected to the first upstream port and an input device. The first host generates a first operation result on the first display area according to the input operation of the input device on the first display area. The first host transmits a first indication signal to the second host through the first bridge according to the input operation of the input device on the second display area, so that the second host emulates the input operation on the second display area to generate a second operation result on the second display area.

In addition, an embodiment of the present invention provides a display device, which includes a hub device, a control device and a display panel. The hub device includes a first upstream port, a second upstream port, a first bridge, a first downstream port and a second downstream port. The first upstream port is connected to a first host. The second upstream port is connected to a second host. The first bridge is connected to the second upstream port. The first downstream port is connected to the first bridge and the first upstream port. The second downstream port is connected to the first upstream port and an input device. The display panel has a first display area and a second display area. The control device is connected to the display panel, the hub device, the first host and the second hub. The control device is configured to set the first display area corresponding to the first host and the second display area corresponding to the second host to generate a setting message. The display device is connected to the control device and displays the first display area and the second display area. The first host receives the setting message through the control device to obtain the display setting relationship of the first display area and the second display area. The first host generates a first operation result on the first display area according to the input operation of the input device on the first display area. The first host transmits a first indication signal to the second host through the first bridge according to the input operation of the input device on the second display area, so that the second device emulates the input operation on the second display area to generate a second operation result on the second display area.

Furthermore, an embodiment of the present invention provides an operation method of a display device, which includes the following steps. A first upstream port of a hub device is used to connect to a first host. A second upstream port of the hub device is used to connect to a second host. A first bridge of the hub device is used to connect to the second upstream port. A first downstream port is used to connect to the first bridge and the first upstream port. A second downstream port is used to connect to the first upstream port and an input device. A control device is used to connect to the hub device, the first host and the second host. A first display area corresponding to the first host and a second display area corresponding to the second host are set by the control device to generate a setting message. A display panel is used to connect to the control device, so as to display the first display area and the second display area. The setting message is received by the first host through the hub device, so as to obtain the display setting relationship of the first display area and the second display area. A first display result on the first display area is generated by the first host according to the input operation of the input device on the first display area. A first indication signal is transmitted by the first host to the second host through the first bridge according to the input operation of the input device on the second display area. The second host emulates the input operation on the second display area according to the first indication signal to generate a second operation result on the second display area.

According to the hub device, the display device and the operation method thereof disclosed by the embodiment of the present invention, the first host is connected to the input device, and the second host is connected to the first host device through the first bridge. Accordingly, the first host may generate the first operation result according the input operation of the input device on the first display area. Alternatively, the first host transmits the first indication signal to the second host through the first bridge according to the input operation of the input device on the second display area, so that the second host emulates the input operation on the second display area according to the first indication signal to generate the second operation result on the second display area. Therefore, a plurality of hosts may share the same input device, so as to increase the convenience of use.

BRIEF DESCRIPTION OF THE DRAWINGS

The present invention can be more fully understood by reading the subsequent detailed description and examples with references made to the accompanying drawings, wherein:

FIGS. 7A and 7B show a flowchart of an operation method of a display device according to another embodiment of the present invention.

DETAILED DESCRIPTION OF THE INVENTION

In each of the following embodiments, the same reference number represents the same or similar element or component.

Figure 1:
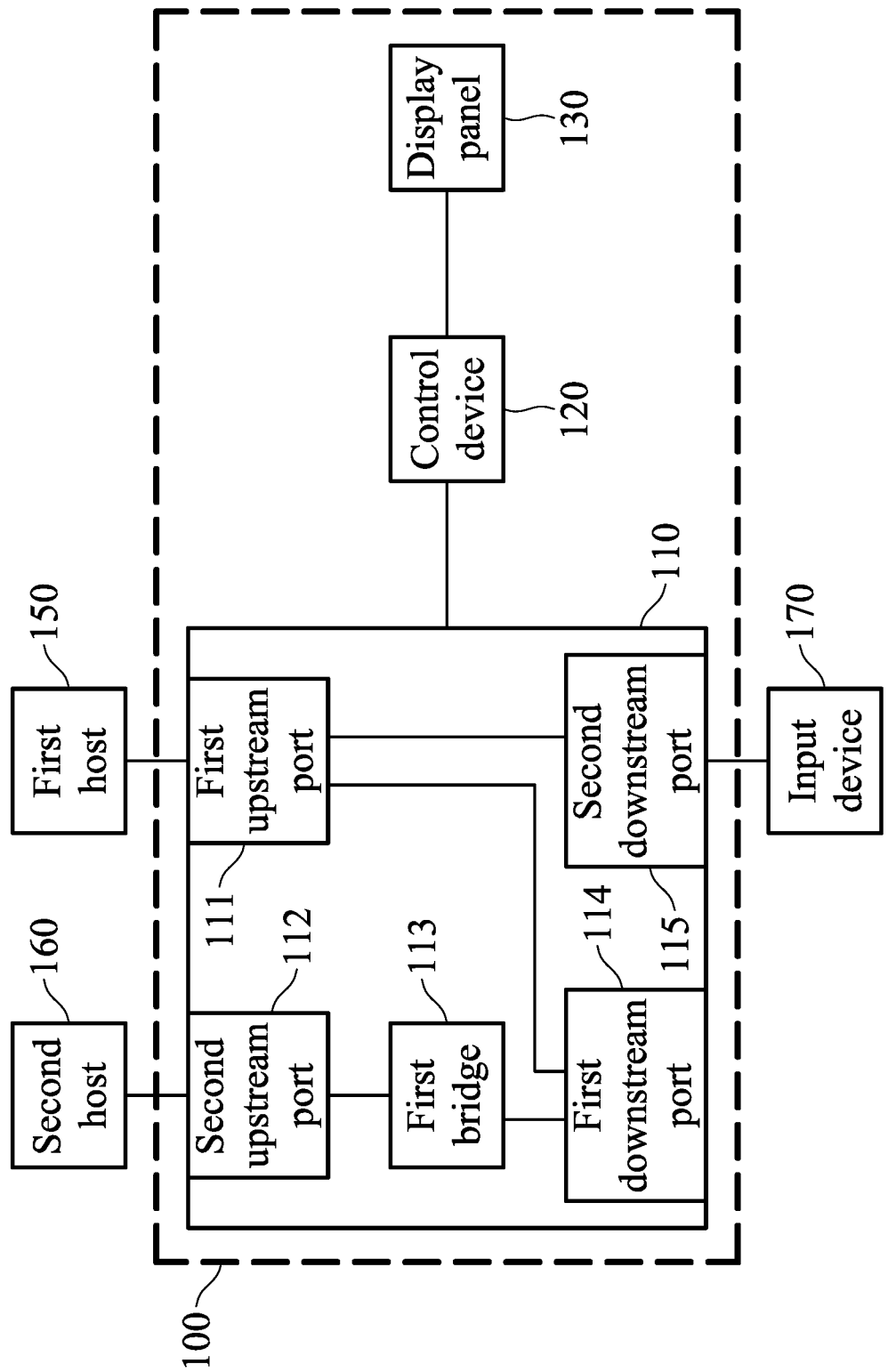
FIG. 1 shows a schematic view of a display device according to an embodiment of the present invention.

FIG. 1 shows a schematic view of a display device according to an embodiment of the present invention. Please refer to FIG. 1. The display device 100 includes a hub device 110, a control device 120 and a display panel 130. In the embodiment, the display device 100 may be a widescreen display, such as a liquid crystal display (LCD), a light emitting diode (LED) display, a field emission display (FED), or other kinds of displays. In addition, the display panel 130 may be a widescreen display panel, such as 32:9 or 21:9. Furthermore, the display device 100 may be an independent display or monitor, or a display disposed on an electronic device.

The hub device 110 includes a first upstream port 111, a second upstream port 112, a first bridge 113, a first downstream port 114 and a second downstream port 115. The first upstream port 111 is connected to a first host 150. The second upstream port 112 is connected to a second host 160. The first bridge 113 is connected to the second upstream port 112. The first downstream port 114 is connected to the first bridge 113 and the first upstream port 111. The second downstream port 115 is connected to the first upstream port 111 and an input device 170.

In the embodiment, the first host 150 and the second host 160 are respectively, for example, a personal computer (PC), a notebook computer, a server host, etc. In addition, examples of the input device 170 include a keyboard (such as a wired keyboard or a wireless keyboard), a mouse (such as a wired mouse or a wireless mouse) a touch panel, and combinations thereof. In FIG. 1, the number of the input device 170 and the number of second downstream port 115 are one, but the embodiment of the present invention is not limited thereto. For example, when the input device 170 includes two of the following: a keyboard, a mouse, and a touch panel, there are two second downstream ports 115. When the input device 170 includes a keyboard, a mouse, and a touch panel, there are three second downstream ports 115.

In addition, the hub device 110 is, for example, a universal serial bus (USB) hub. The first upstream port 111, the second upstream port 112, the first downstream port 114 and the second downstream port 115 are a universal series bus connector. Furthermore, the first upstream port 111 and the second upstream port 112 are respectively an upstream facing port (UFP) of the universal series bus connector, and the first upstream port 111 and the second upstream port 112 may respectively be a USB 2.0 or 3.0 connector and be a USB-B or USB-C port. The first downstream port 114 and the second downstream port 115 are respectively, for example, a downstream facing port (DFP) of the universal series bus connector, and the second downstream port 115 may be a USB-A port.

The control device 120 is connected to the hub device 110, the first host 150 and the second hub 160. In the embodiment, the control device 120 is, for example, a scaler having a frame zoom function, a micro-controller unit (MCU), a central processing unit (CPU) or other hardware devices having computing processing capability.

In addition, the control device 120 may be configured to set the first display area corresponding to the first host 150 and the second display area corresponding to the second host 160 on the display panel 130 to generate a setting message. In the embodiment, the setting is, for example, a picture by picture (PBP), a picture in picture, PIP), etc. That is, the control device 120 receives a first frame signal of the first host 150 and a second frame signal of the second host 160, and performs a display setting for display areas of the first frame signal and the second frame signal.

Figure 2A:
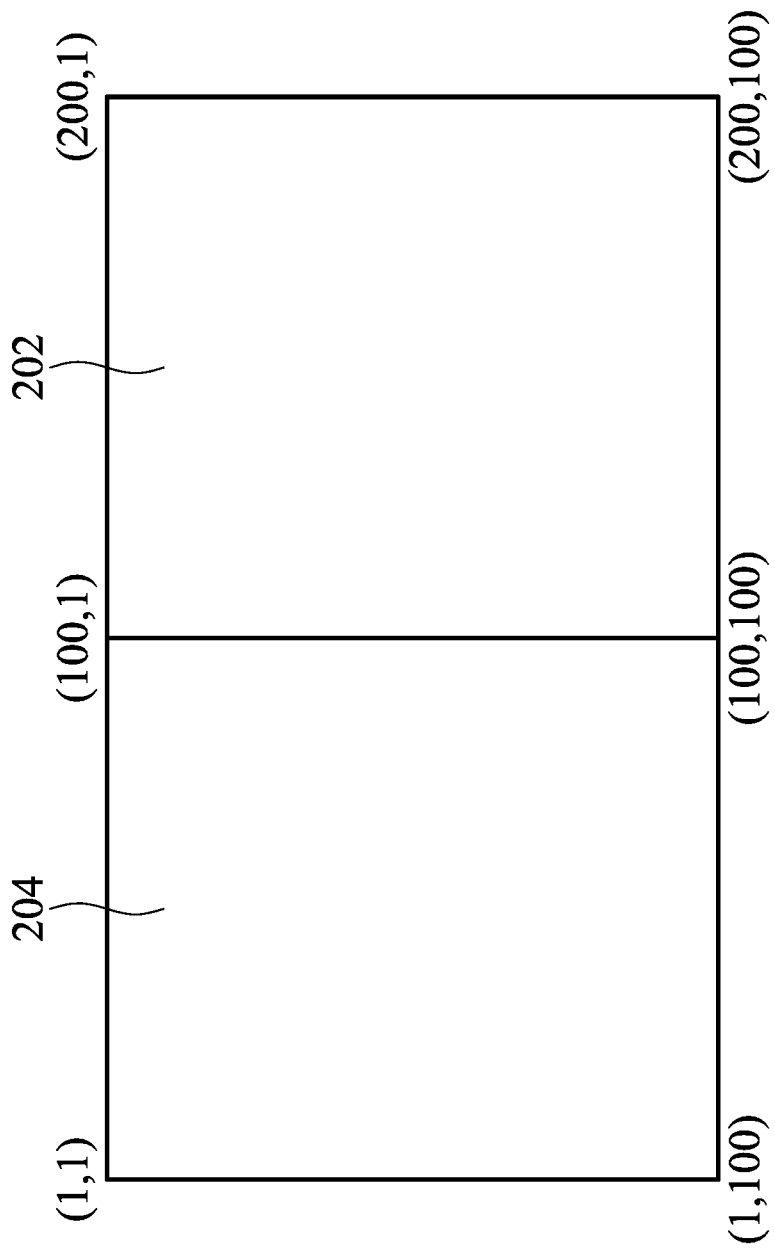
FIG. 2A shows a schematic view of a first display area and a second display area according to an embodiment of the present invention.
Figure 2B:
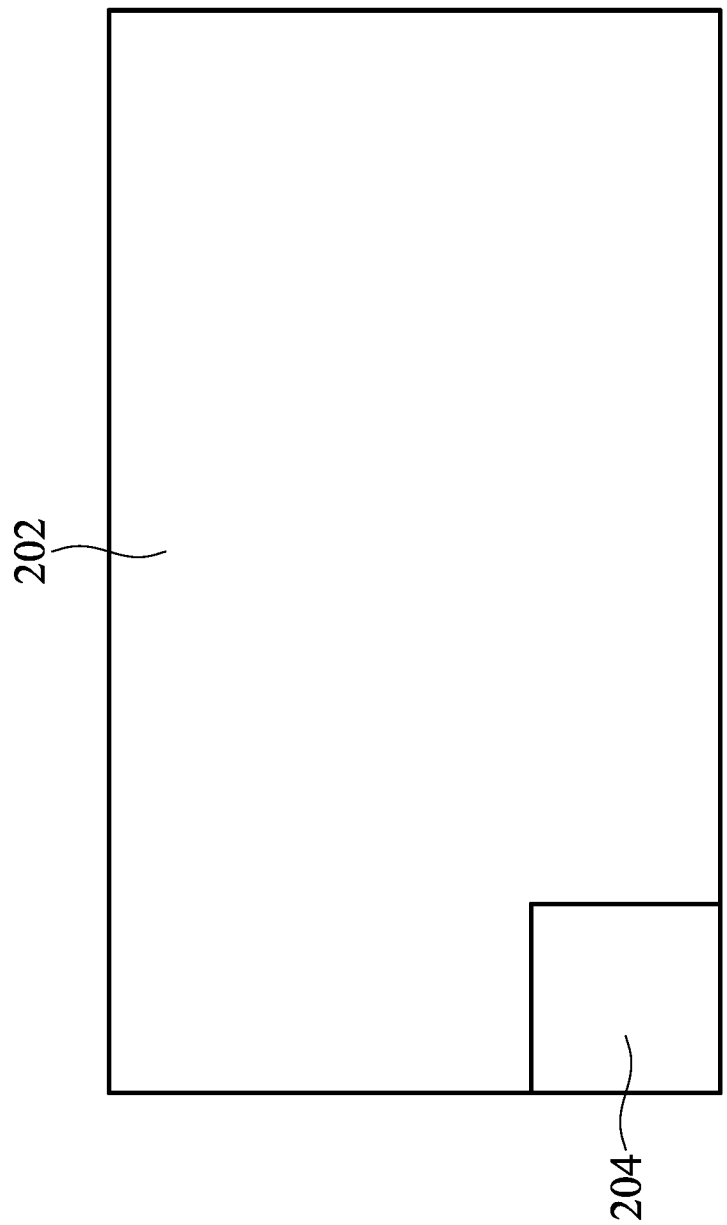
FIG. 2B shows a schematic view of a first display area and a second display area according to another embodiment of the present invention.

For example, the first display area 202 corresponding to the first host 150 is defined by a set of coordinates (100,1), a set of coordinates (200,1), a set of coordinates (100,100) and a set of coordinates (200,100), and the second display area 204 corresponding to the second host 160 is defined by a set of coordinates (1,1), a set of coordinates (100,1), a set of coordinates (1,100), a set of coordinates (100,100), as shown in FIG. 2A. Therefore, a frame corresponding to the first frame signal may be displayed on the first display area 202, and a frame corresponding to the second frame signal may be displayed on the second display area 204. In some embodiments, the first display area 202 and the second display area 204 may also be as shown in FIG. 2B.

In addition, the control device 120 may also generate the setting message having the above display setting, i.e., the setting message includes, for example, the display setting relationship of the first display area 202 and the second display area 204. The control device 120 may be connected to the first host 150 and the second host 160 through a video port, respectively. The video port may be, but is not limited to, a video graphic array (VGA) port, a digital video interface (DVI) port, a high definition multimedia interface (HDMI) port, etc. Furthermore, the control device 120 is, for example, connected to the hub device 110 through an inter-integrated circuit (I2C) bus.

The display panel 130 is connected to the control device 120 and respectively displays the frame signals of the first host 150 and the second host 160 on the first display area 202 and the second display area 204. That is, the display panel 130 correspondingly displays the frame signals and the operation results of the first host 150 and the second host 160 on the first display area 202 and the second display area 204 according to the setting message of the control device 120.

The first host 150 receives the setting message through the control device 120 to obtain the display setting relationship of the first display area 202 and the second display area 204. That is, the first host 150 obtains the setting message from the control device 120 through the hub device 110, and obtains the display setting relationship of the first display area 202 and the second display area 204 according to the setting message.

In the embodiment, the first host 150 is set as a master device, and the second host 160 is set as a slave device. In addition, the first host 150 and the second host 160 are respectively installed with a driving program (such as WinUSB or LibUSB) of an application (APP), and the data of the first host 150 and the second host 160 are transmitted through the first bridge 113. For example, the first host 150 may transmit the display setting relationship of the first display area 202 and the second display area 204 and the input operation of the input device 170 to the second host 160 through the first bridge 113, so that the second host 160 may perform the subsequent operation.

The first host 150 generates the first operation result on the first display area 202 according to the input operation of the input device 170 on the first display area 202. At this time, the input operation of the input device 170 may be a click operation, a drag operation, etc. That is, when the user operates the input device 170 to generate the input operation on the set of coordinates (105,7) of the first display area 202, the first host 150 may receive the input operation. The first host 150 determines that the input operation corresponding to the set of coordinates (105,7) is generated on the first display area 202 according to the display setting relationship of the first display area 202 and the second display area 204. Accordingly, the first host 150 may generate and/or display the first operation result corresponding to the input operation on the first display area 202. That is, the user may see the first operation result on the first display area 202. In the embodiment of the present invention, the operation result may be a frame generated by the host according to the corresponding input operation and displayed on the display device.

In addition, the first host 150 transmits a first indication signal to the second host 160 through the first bridge 113 according to the input operation (such as the click operation or the drag operation) of the input device 170 on the second display area 204, so that the second host 160 emulates the input operation on the second display area 204 to generate the second operation result on the second display area 204. That is, when the user operates the input device 170 to generate the input operation on the set of coordinates (5,7) of the second display area 204, the first host 150 may receive the input operation. The first host 150 determines that the input operation corresponding to the set of coordinates (5,7) is generated on the second display area 204 according to the display setting relationship of the first display area 202 and the second display area 204. At this time, the first host 150 discontinues generating and/or display the corresponding operation result on the first display area 202.

Then, the first host 150 may transmit the first indication signal to the second host 160 through the first bridge 113 according to the above input operation. That is, the first host 150 transmits the first indication signal including the input operation corresponding to the set of coordinates (5,7) to the second host 160. Afterward, the second host 160 emulates the input operation (such as the click operation or the drag operation) on the set of coordinates (5,7) of the second display area 204 to generate the second operation result on the second display area 204 according to the first indication signal. That is, the user may see the second operation result on the second display area 204. Therefore, the first host 150 and the second host 160 may share the same input device 170, i.e., the user may operate the first host 150 and the second host 160 through the input device 170, so as to increase the convenience of use.

Furthermore, the first host 150 further determines whether the position of the input operation of the input device 170 enters the second display area 204 from an edge of the first display area 202. That is, the first host 150 determines whether the position of the mouse cursor of the input device 170 enters the second display area 204 from the edge of the first display area 202. For example, the first host 150 determines whether the position of the mouse cursor moves to the X coordinate "99" from the X coordinate "101". When the first host 150 determines that the input operation does not enter the second display area 204 from the edge of the first display area 202, it indicates that the input operation is still performed on the first display area 202. At this time, the first host 150 continues generating the first operation result on the first display area 202 according to the input operation (such as the click operation or the drag operation) on the first display area 202 in response to the input operation not entering the second display area 204 from the edge of the first display area 202.

In addition, when the first host 150 determines that the input operation enters the second display area 204 from the edge of the first display area 202, it indicates that the input operation is performed on the second display area 204. At this time, the first host 150 discontinues generating the first operation result and generates the first indication signal indicating the input operation being performed on the second display area 204 in response to the input operation entering the second display area 204 from the edge of the first display area 202. Then, the first host 150 transmits the first indication signal to the second host 160 through the first bridge 113, so that the second host 160 may emulate the input operation (such as the click operation or the drag operation) on the second display area 204 to generate the second operation result on the second display area 204.

Afterward, the second host 160 may further determine whether the position of the input operation of the input device 170 enters the first display area 202 from an edge of the second display area 204. That is, the second host 160 determines whether the position of the mouse cursor of the input device 170 enters the first display area 202 from the edge of the second display area 204. For example, the second host 160 determines whether the position of the mouse cursor moves to the X coordinate "101" from the X coordinate "99". When the second host 160 determines that the input operation does not enter the first display area 202 from the edge of the second display area 204, it indicates that the input operation is performed on the second display area 204. At this time, the second host 160 continues emulating the input operation (such as the click operation or the drag operation) on the second display area 204 according to the first indication signal to generate the second operation result on the second display area 204 in response to the input operation result not entering the first display area 202 from the edge of the second display area 204.

In addition, when the second host 160 determines that the input operation enters the first display area 202 from the edge of the second display area 204, it indicates that the input operation is performed on the first display area 202. At this time, the second host 160 discontinues generating the second operation result and generates a notification signal indicating the input operation being performed on the first display area 202 in response to the input operation entering the first display area 202 from the edge of the second display area 204. Then, the second host 160 transmits the notification signal to the first host 150 through the first bridge 113, so that the first host 150 generates the first operation result on the first display area 202 according to the input operation (such as the click operation or the drag operation) on the first display area 202.

In the embodiment of FIG. 1, the hub device 110 is disposed inside the display device 100, but the embodiment of the present invention is not limited thereto. In other embodiments, the hub device 110 may be independent of the display device 100 and the same effect may be achieved. In addition, the display device 100 may further include an on screen display (OSD) device, a power device and a backlight-driving device. The OSD device, the power device and the backlight-driving device are connected to the control device 120. The OSD device may be configured to display an OSD frame on the display panel 130, so that the user may operate the OSD. The power device is configured to provide a required power of the display device 100. The backlight-driving device is configured to provide a required light source of the display panel 130.

Figure 3:
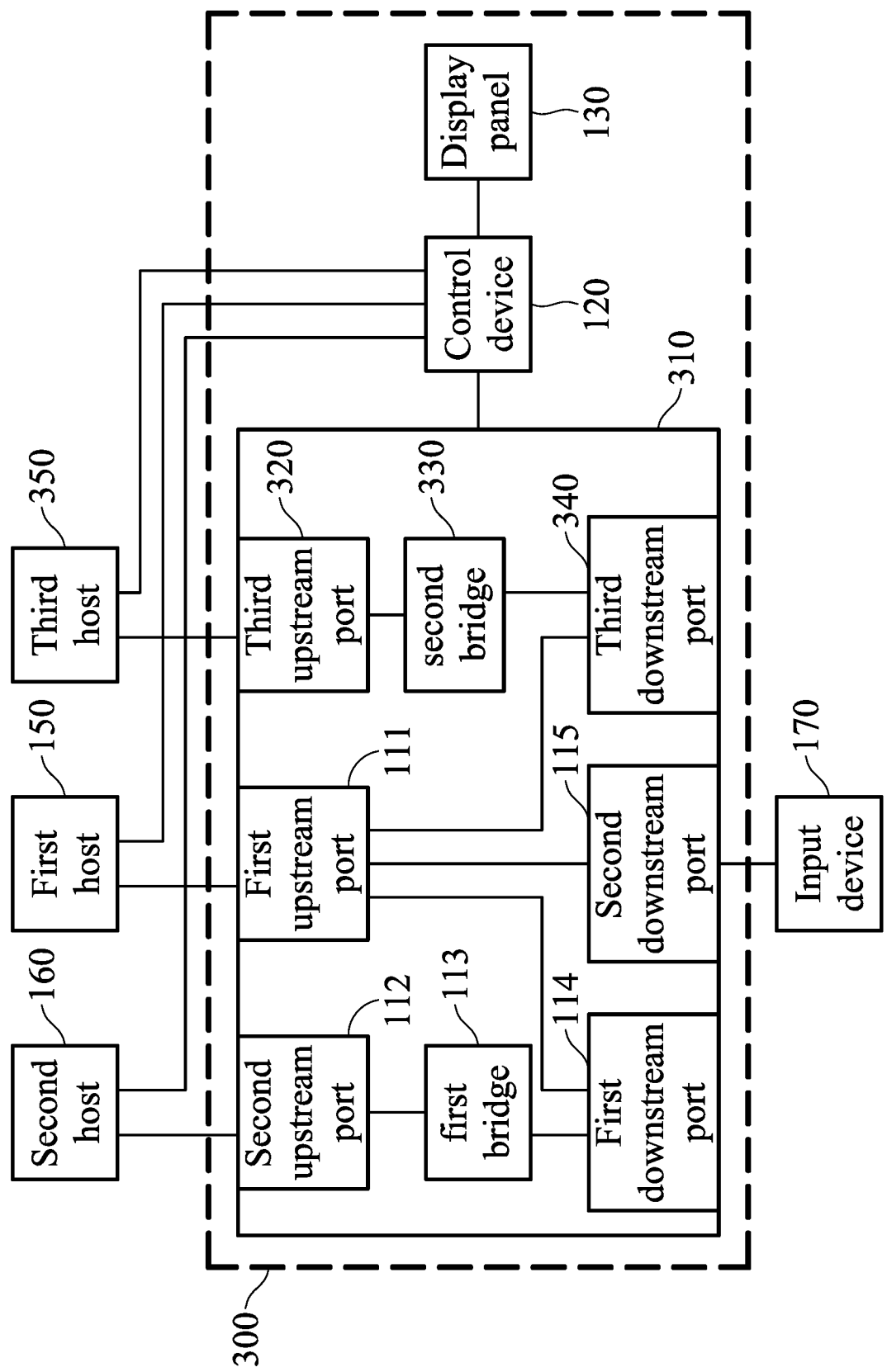
FIG. 3 shows a schematic view of a display device according to another embodiment of the present invention.

FIG. 3 shows a schematic view of a display device according to another embodiment of the present invention. Please refer to FIG. 3. The display device 300 includes a hub device 310, a control device 120 and a display panel 130. In the embodiment, the control device 120 and the display panel 130 in FIG. 3 are identical to or similar to the control device 120 and the display panel 130 in FIG. 1. Accordingly, the description of the control device 120 and the display panel 130 in FIG. 3 may refer to the description of the embodiment of the present invention, and the description thereof is not repeated herein.

The hub device 310 includes a first upstream port 111, a second upstream port 112, a first bridge 113, a first downstream port 114, a second downstream port 115, a third upstream port 320, a second bridge 330 and a third downstream port 340. In the embodiment, the first upstream port 111, the second upstream port 112, the first bridge 113, the first downstream port 114 and the second downstream port 115 in FIG. 3 are identical to or similar to the first upstream port 111, the second upstream port 112, the first bridge 113, the first downstream port 114 and the second downstream port 115 in FIG. 1. Accordingly, the description of the first upstream port 111, the second upstream port 112, the first bridge 113, the first downstream port 114 and the second downstream port 115 in FIG. 3 may refer to the description of the embodiment in FIG. 1, and the description thereof is not repeated herein. In addition, the operations of the first host 150 and the second host 160 may refer to the description of the embodiment in FIG. 1, and the description thereof is not repeated herein.

The third upstream port 320 is connected to a third host 350. The second bridge 330 is connected to the third upstream port 320. The third downstream port 340 is connected to the second bridge 330 and the first upstream port 111. In the embodiment, the third upstream port 320 and the third downstream port 340 are respectively a universal series bus connector. Furthermore, the third upstream port 320 is, for example, an upstream facing port of the universal series bus connector, and the third upstream port 320 may be a USB 2.0 or 3.0 connector and be a USB-B or USB-C port. The third downstream port 340 is, for example, a downstream facing port of the universal series bus connector.

The control device 120 is further connected to the third host 350. The control device 120 may set the first display area corresponding to the first host 150, the second display area corresponding to the second host 160, and a third display area corresponding to the third host 350 to generate a setting message. That is, the control device 120 receives a first frame signal of the first host 150, a second frame signal of the second host 160 and a third frame signal of the third host 350, performs a display setting for display areas of the first frame signal, the second frame signal and the third frame signal.

Figure 4A:
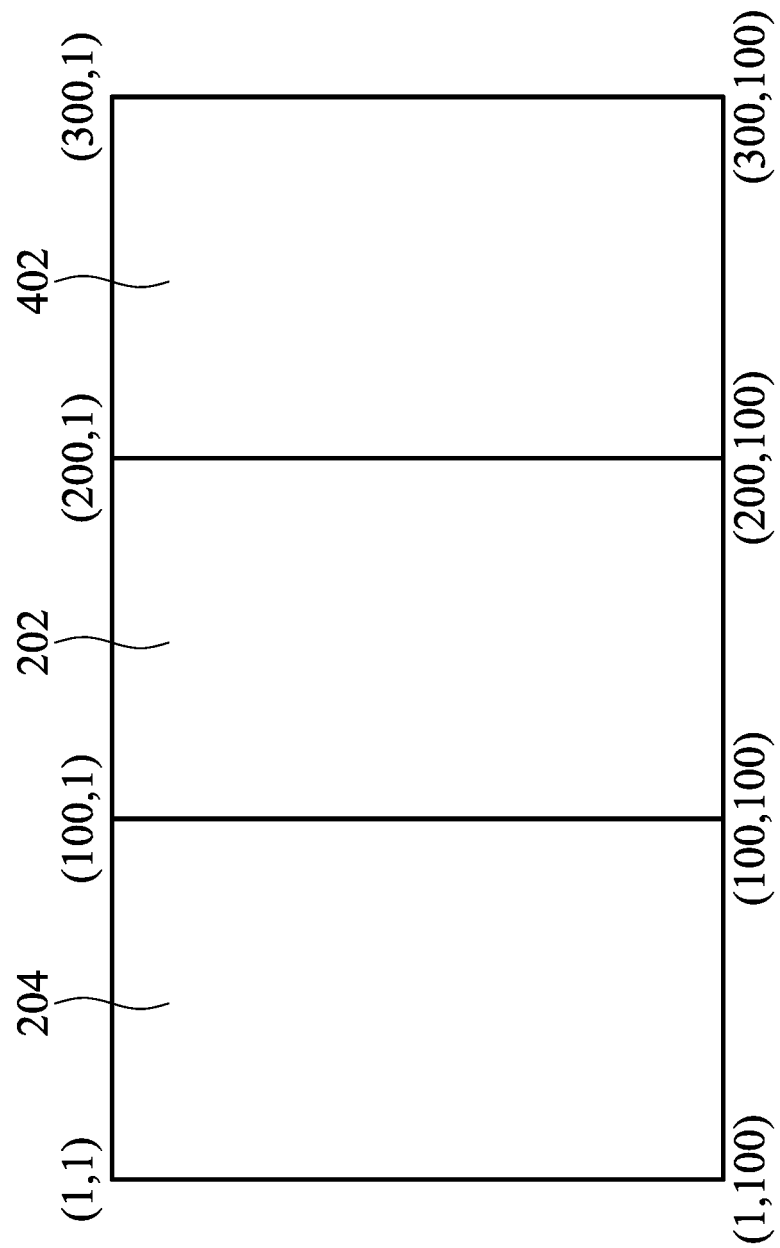
FIG. 4A shows a schematic view of a first display area, a second display area and a third display area according to an embodiment of the present invention.

For example, the first display area 202 corresponding to the first host 150 is defined by a set of coordinates (100,1), a set of coordinates (200,1), a set of coordinates (100,100) and a set of coordinates (200,100), the second display area 204 corresponding to the second host 160 is defined by a set of coordinates (1,1), a set of coordinates (100,1), a set of coordinates (1,100), a set of coordinates (100,100), and the third display area 402 of the third host 350 is defined by a set of coordinates (200,1), a set of coordinates (300,1), a set of coordinates (200,100), a set of coordinates (300,100), as shown in FIG. 4A.

Figure 4B:
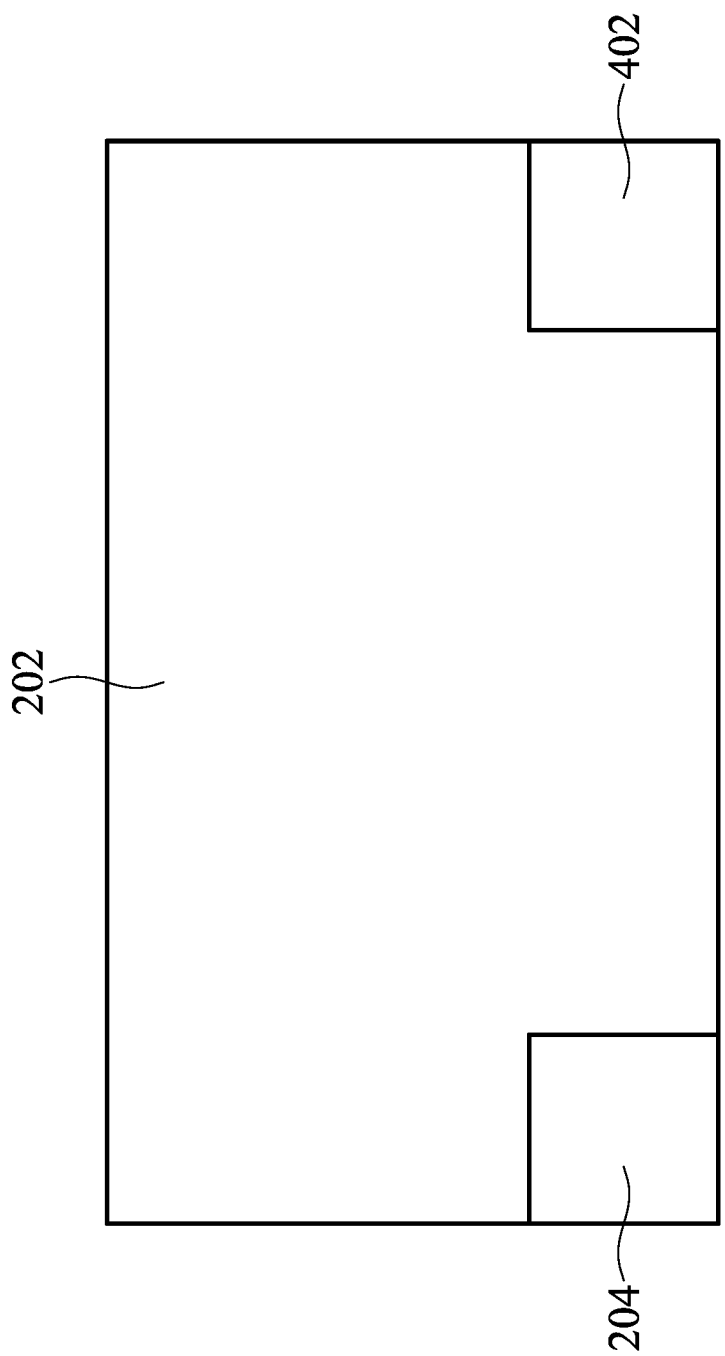
FIG. 4B shows a schematic view of a first display area, a second display area and a third display area according to another embodiment of the present invention.

Therefore, a frame corresponding to the first frame signal may be displayed on the first display area 202, a frame corresponding to the second frame signal may be displayed on the second display area 204, and a frame corresponding to the third frame signal may be displayed on the third display area 402. In some embodiments, the first display area 202, the second display area 204 and the third display area 402 may also be as shown in FIG. 4B. In addition, the control device 120 may also generate the setting message having the above display setting, i.e., the setting message includes, for example, the display setting relationship of the first display area 202, the second display area 204 and the third display area 402.

The display panel 130 further displays the frame signals of the first host 150, the second host 160 and the third host 350 on the first display area 202, the second display area 204 and the third display area 402, respectively. That is, the display panel 130 correspondingly displays the frame signals and the operation results of the first host 150, the second host 160 and the third host 350 on the first display area 202, the second display area 204 and the third display area 402 according to the setting message of the control device 120.

The first host 150 receives the setting message through the control device 120 to obtain the display setting relationship of the first display area 202, the second display area 204 and the third display area 402. That is, the first host 150 obtains the setting message from the control device 120 through the hub device 310, and obtains the display setting relationship of the first display area 202 and the second display area 204 and the display setting relationship of the first display area 202 and the third display area 402 according to the setting message.

In the embodiment, the first host 150 is set as a master device, and the second host 160 and the third host 350 are respectively set as a slave device. In addition, the first host 150, the second host 160 and the third host 350 are respectively installed with a driving program (such as WinUSB or LibUSB) of an application (APP). The data of the first host 150 and the second host 160 are transmitted through the first bridge 113 and the data of the first host 150 and the third host 350 are transmitted through the second bridge 330. For example, the first host 150 may transmit the display setting relationship of the first display area 202 and the second display area 204 and the input operation of the input device 170 to the second host 160 through the first bridge 113, so that the second host 160 may perform the subsequent operation. The first host 150 may transmit the display setting relationship of the first display area 202 and the third display area 402 and the input operation of the input device 170 to the third host 350 through the second bridge 330, so that the third host 350 may perform the subsequent operation.

In the embodiment, the first host 150 transmits a second indication signal to the third host 350 through the second bridge 330 according to the input operation (such as the click operation or the drag operation) of the input device 170 on the third display area 402, so that the third host 350 emulates the input operation on the third display area 402 to generate a third second operation result on the third display area 402. That is, when the user operates the input device 170 to generate the input operation on the set of coordinates (205,7) of the third display area 402, the first host 150 may receive the input operation. The first host 150 determines that the input operation corresponding to the set of coordinates (205,7) is generated on the third display area 402 according to the display setting relationship of the first display area 202 and the third display area 402. At this time, the first host 150 discontinues generating the corresponding operation result on the first display area 202.

Then, the first host 150 may transmit the second indication signal to the third host 350 through the second bridge 330 according to the above input operation. That is, the first host 150 transmits the second indication signal including the input operation corresponding to the set of coordinates (205,7) to the third host 350. Afterward, the third host 350 emulates the input operation on the set of coordinates (205,7) of the third display area 402 to generate the third operation result on the third display area 402 according to the second indication signal. That is, the user may see the third operation result on the third display area 402. Therefore, the first host 150, the second host 160 and the third host 350 may share the same input device 170, i.e., the user may operate the first host 150, the second host 160 and the third host 350 through the input device 170, so as to increase the convenience of use.

Furthermore, the first host 150 further determines whether the position of the input operation of the input device 170 enters the third display area 402 from an edge of the first display area 202. That is, the first host 150 determines whether the position of the mouse cursor of the input device 170 enters the third display area 402 from the edge of the first display area 202. For example, the first host 150 determines whether the position of the mouse cursor moves to the X coordinate "201" from the X coordinate "199". When the first host 150 determines that the input operation does not enter the third display area 402 from the edge of the first display area 202, it indicates that the input operation is still performed on the first display area 202. At this time, the first host 150 continues generating the first operation result on the first display area 202 according to the input operation (such as the click operation or the drag operation) on the first display area 202 in response to the input operation not entering the third display area 402 from the edge of the first display area 202.

In addition, when the first host 150 determines that the input operation enters the third display area 402 from the edge of the first display area 202, it indicates that the input operation is performed on the third display area 402. At this time, the first host 150 discontinues generating the first operation result and generates the second indication signal indicating the input operation being performed on the third display area 402 in response to the input operation entering the third display area 402 from the edge of the first display area 202. Then, the first host 150 transmits the second indication signal to the third host 350 through the second bridge 330, so that the third host 350 may emulate the input operation (such as the click operation or the drag operation) on the third display area 402 to generate the third operation result on the third display area 402.

Afterward, the third host 350 may further determine whether the position of the input operation of the input device 170 enters the first display area 202 from an edge of the third display area 402. That is, the third host 350 determines whether the position of the mouse cursor of the input device 170 enters the first display area 202 from the edge of the third display area 402. For example, the third host 350 determines whether the position of the mouse cursor moves to the X coordinate "199" from the X coordinate "201". When the third host 350 determines that the input operation does not enter the first display area 202 from the edge of the third display area 402, it indicates that the input operation is performed on the third display area 402. At this time, the third host 350 continues emulating the input operation (such as the click operation or the drag operation) on the third display area 402 according to the second indication signal to generate the third operation result on the third display area 402 in response to the input operation result not entering the first display area 202 from the edge of the third display area 402.

In addition, when the third host 350 determines that the input operation enters the first display area 202 from the edge of the third display area 402, it indicates that the input operation is performed on the first display area 202. At this time, the third host 350 discontinues generating the third operation result and generates a notification signal indicating the input operation being performed on the first display area 202 in response to the input operation entering the first display area 202 from the edge of the third display area 402. Then, the third host 350 transmits the notification signal to the first host 150 through the second bridge 330, so that the first host 150 generates the first operation result on the first display area 202 according to the input operation (such as the click operation or the drag operation) on the first display area 202.

Figure 5:
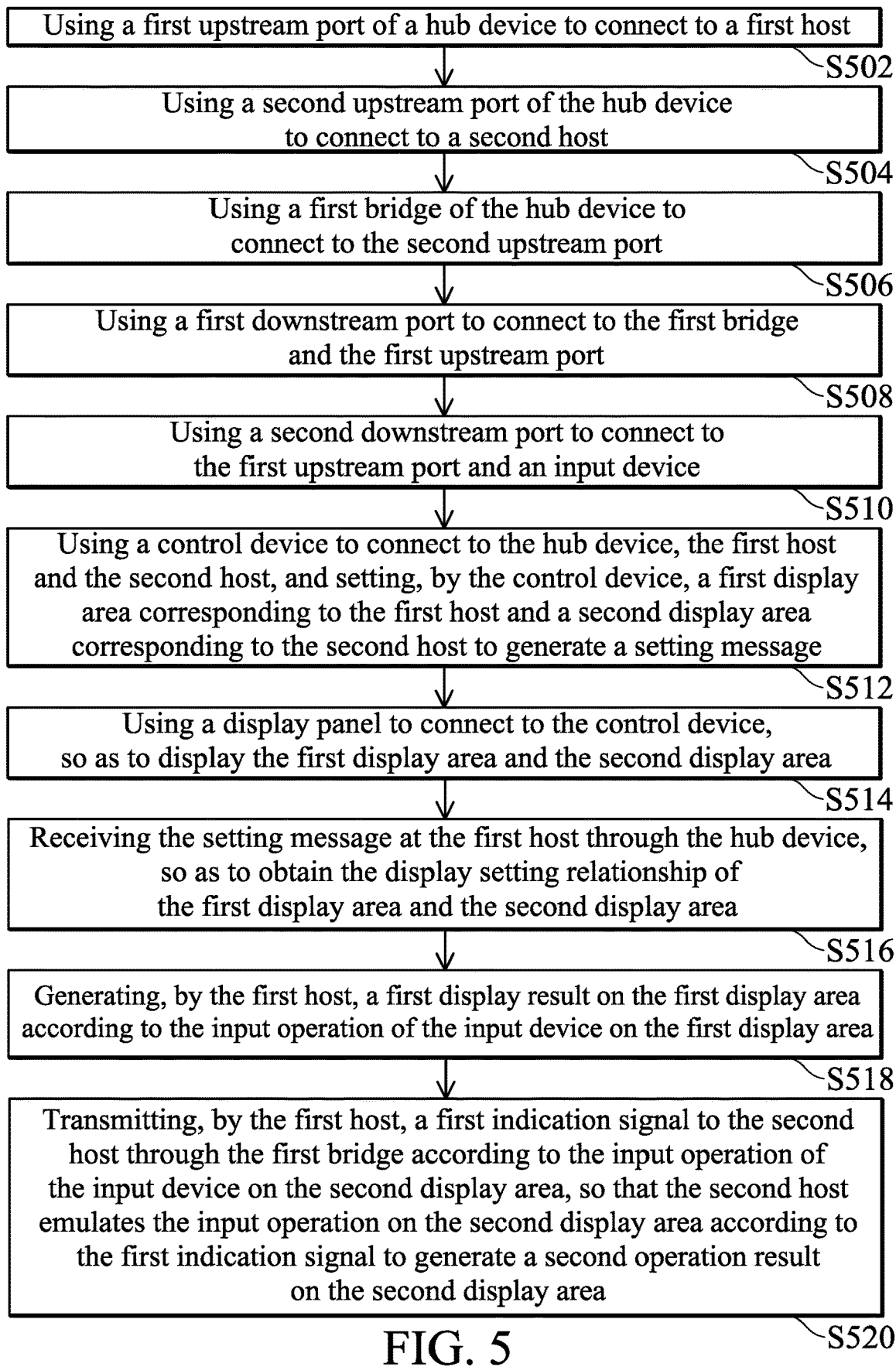
FIG. 5 shows a flowchart of an operation method of a display device according to an embodiment of the present invention.

According to the above-mentioned description, the embodiment of the present invention additionally provides an operation method of a display device. FIG. 5 shows a flowchart of an operation method of a display device according to an embodiment of the present invention. In step S502, the method involves using a first upstream port of a hub device to connect to a first host. In step S504, the method involves using a second upstream port of the hub device to connect to a second host. In step S506, the method involves using a first bridge of the hub device to connect to the second upstream port. In step S508, the method involves using a first downstream port to connect to the first bridge and the first upstream port.

In step S510, the method involves using a second downstream port to connect to the first upstream port and an input device. In step S512, the method involves using a control device to connect to the hub device, the first host and the second host, and setting, by the control device, a first display area corresponding to the first host and a second display area corresponding to the second host to generate a setting message. In step S514, the method involves using a display panel to connect to the control device, so as to display the first display area and the second display area. In step S516, the method involves receiving the setting message at the first host through the hub device, so as to obtain the display setting relationship of the first display area and the second display area.

In step S518, the method involves generating, by the first host, a first display result on the first display area according to the input operation of the input device on the first display area. In step S520, the method involves transmitting, by the first host, a first indication signal to the second host through the first bridge according to the input operation of the input device on the second display area, so that the second host emulates the input operation on the second display area according to the first indication signal to generate a second operation result on the second display area. In the embodiment, the input device includes a mouse, a keyboard, a touch panel, or a combination thereof. In addition, the hub device is a universal series bus hub, and the first upstream port, the second upstream port, the first downstream port and the second downstream port are respectively a universal series bus connector.

Figure 6:
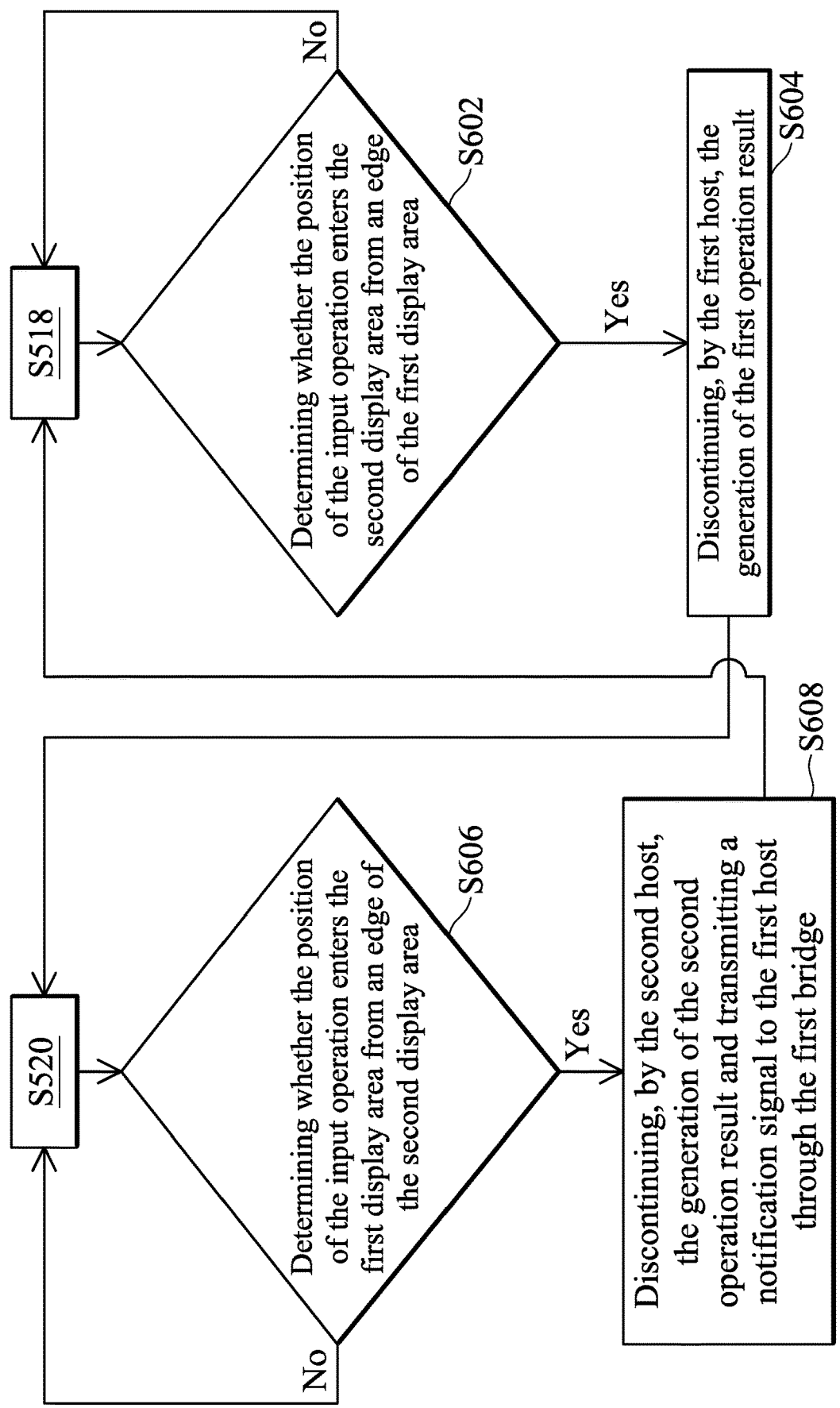
FIG. 6 shows a flowchart continuing to steps S518 and S520 in FIG. 5.

FIG. 6 shows a flowchart continuing to steps S518 and S520 in FIG. 5. In step S602, the method involves determining whether the position of the input operation enters the second display area from an edge of the first display area. When determining that the position of the input operation does not enter to the second display area from the edge of the first display area, the method performs step S518. In the step S518, the method involves continuing to generate, by the first host, the first operation result on the first display area according to the input operation on the first display area in response to the input operation not entering the second display area from the edge of the first display area.

When determining that the position of the input operation enters the second display area from the edge of the first display area, the method performs step S604. In step S604, the method involves discontinuing, by the first host, the generation of the first operation result in response to the input operation entering the second display area from the edge of the first display area. Then, the method performs step S520.

In step S606, the method involves determining whether the position of the input operation enters the first display area from an edge of the second display area. When determining that the position of the input operation does not enter to the first display area from the edge of the second display area, the method performs step S520. In the step S520, the method involves continuing to emulate, by the second host, the input operation on the second display area to generate the second operation result on the second display area in response to the input operation not entering the first display area from the edge of the second display area.

When determining that the position of the input operation enters the first display area from the edge of the second display area, the method performs step S608. In step S608, the method involves discontinuing, by the second host, the generation of the second operation result and transmitting a notification signal to the first host through the first bridge in response to the input operation entering the first display area from the edge of the second display area. Then, the method performs step S518.

Figure 7A:
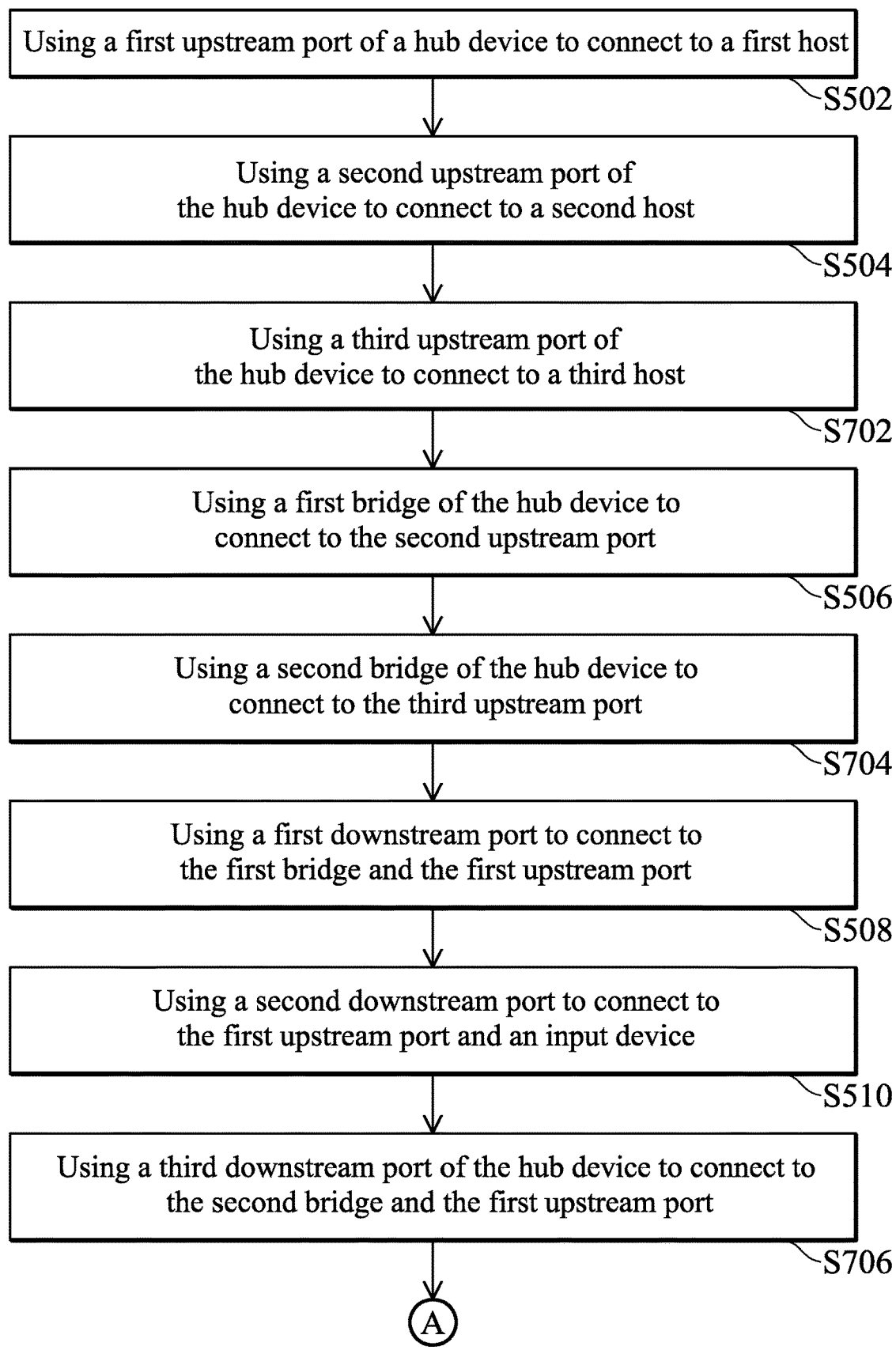

FIGS. 7A and 7B show a flowchart of an operation method of a display device according to another embodiment of the present invention. In the embodiment, steps S502 to S520 in FIGS. 7A and 7B are identical to or similar to steps S502 to S520 in FIG. 5. Accordingly, the description of steps S502 to S520 in FIGS. 7A and 7B may refer to the description of the embodiment in FIG. 5, and the description thereof is not repeated herein. In step S702, the method involves using a third upstream port of the hub device to connect to a third host. In step S704, the method involves using a second bridge of the hub device to connect to the third upstream port. In step S706, the method involves using a third downstream port of the hub device to connect to the second bridge and the first upstream port.

In step S708, the method involves using a control device to connect to the hub device, the first host, the second host and the third host, and setting, by the control device, a first display area corresponding to the first host, a second display area corresponding to the second host and a third display area corresponding to a third host to generate a setting message. In step S710, the method involves using a display panel to connect to the control device, so as to display the first display area, the second display area and the third display area.

In step S712, the method involves receiving the setting message at the first host through the hub device, so as to obtain the display setting relationship of the first display area, the second display area and the third display area. In step S714, the method involves transmitting, by the first host, a second indication signal to the second host through the second bridge according to the input operation of the input device on the third display area, so that the third host emulates the input operation on the third display area according to the second indication signal to generate a third operation result on the third display area. In the embodiment, the input device includes one of a mouse, a keyboard, a touch panel, or a combination thereof. In addition, the hub device is a universal series bus hub, and the first upstream port, the second upstream port, the first downstream port, the second downstream, the third upstream port and the third downstream port are respectively a universal series bus connector.

Figure 8:
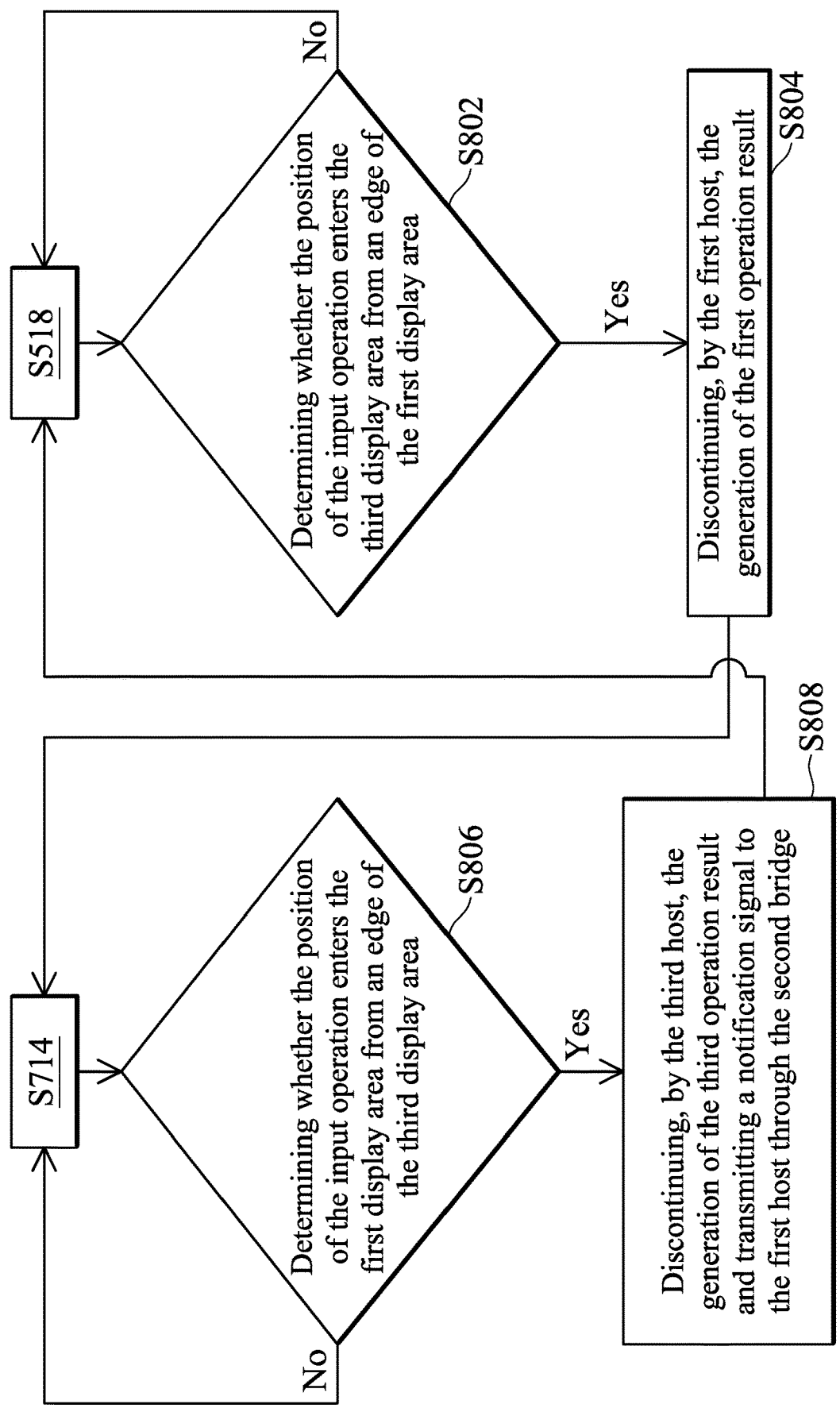
FIG. 8 shows a flowchart continuing to steps S518 and S714 in FIG. 8.

FIG. 8 shows a flowchart continuing to steps S518 and S714 in FIG. 8. In step S802, the method involves determining whether the position of the input operation enters the third display area from an edge of the first display area. When determining that the position of the input operation does not enter to the third display area from an edge of the first display area, the method performs step S518. In step S518, the method involves continuing to generate, by the first host, the first operation result on the first display area according to the input operation on the first display area in response to the input operation not entering the third display area from the edge of the first display area.

When determining that the position of the input operation enters the third display area from an edge of the first display area, the method performs step S804. In step S804, the method involves discontinuing, by the first host, the generation of the first operation result in response to the input operation entering the third display area from the edge of the first display area. Then, the method performs step S714.

In step S806, the method involves determining whether the position of the input operation enters the first display area from an edge of the third display area. When determining the position of the input operation does not enter the first display area from the edge of the third display area, the method performs step S714. In step S714, the method involves continuing to emulate, by the third host, the input operation on the third display area to generate the third operation result on the third display area in response to the input operation not entering the first display area from the edge of the third display area.

When determining the position of the input operation enters the first display area from the edge of the third display area, the method performs step S808. In step S808, the method involves discontinuing, by the third host, the generation of the third operation result and transmitting a notification signal to the first host through the second bridge in response to the input operation entering the first display area from the edge of the third display area. Then, the method performs step S518.

It should be noted that the order of the steps of FIG. 5, FIG. 6, FIG. 7A, FIG. 7B and FIG. 8 is only for illustrative purpose, but not intended to limit the order of the steps of the embodiment of the present invention. The user may change the order of the steps above according the requirement thereof. The flowcharts described above may add additional steps or use fewer steps without departing from the spirit and scope of the embodiment of the present invention.

In summary, according to the hub device, the display device and the operation method thereof disclosed by the embodiment of the present invention, the first host is connected to the input device, and the second host is connected to the first host through the first bridge. Accordingly, the first host may generate the first operation result according the input operation of the input device on the first display area. Alternatively, the first host transmits the first indication signal to the second host through the first bridge according to the input operation of the input device on the second display area, so that the second host emulates the input operation on the second display area according to the first indication signal to generate the second operation result on the second display area. In addition, in the embodiment of the present invention, the third host may further be connected to the first host through the second bridge. Accordingly, the first host may transmit the second indication signal to the third host through the second bridge according to the input operation of the input device on the third display area, so that the third host emulates the input operation on the third display area according to the second indication signal to generate the third operation result on the third display area. Therefore, a plurality of hosts may share the same input device, so as to increase the convenience of use.

While the invention has been described by way of example and in terms of the preferred embodiments, it should be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A hub device, comprising:
   a first upstream port, connected to a first host, wherein the first host corresponds to a first display area;
   a second upstream port, connected to a second host, wherein the second host corresponds to a second display area;
   a first downstream port, connected to the first upstream port;
   a first bridge, connected between the second upstream port and the first downstream port; and
   a second downstream port, connected to the first upstream port and an input device;
   wherein first upstream port, the second upstream port, the first downstream port, the second downstream port and the first bridge are configured such that:
      an input operation of the input device on the first display area is communicated from the input device through the second downstream port to the first upstream port and to the first host so as to generate a first operation result on the first display area according to the input operation of the input device on the first display area,
      an input operation of the input device on the second display area is communicated from the input device through the second downstream port to the first upstream port and to the first host, and
      a first indication signal generated by the first host in response to the input operation of the input device on the second display area is communicated through the first upstream port to the first downstream port to the first bridge to the second upstream port and to the second host, so that the second host emulates the input operation on the second display area according to the first indication signal to generate a second operation result on the second display area.

2. The hub device as claimed in claim 1, wherein the input device comprises a mouse, a keyboard, a touch plate, or a combination thereof.

3. The hub device as claimed in claim 1, wherein the hub device is a universal series bus hub, and the first upstream port, the second upstream port, the first downstream port and the second upstream are a universal series bus connector.

4. The hub device as claimed in claim 1, further comprising:
   a third upstream port, connected to a third host, wherein the third host corresponds to a third display area;
   a third downstream port, connected to the first upstream port; and
   a second bridge, connected between the third upstream port and the third downstream port;
   wherein first upstream port, the third upstream port, the first downstream port, the third downstream port and the second bridge are configured such that:
      an input operation of the input device on the third display area is communicated from the input device through the second downstream port to the first upstream port and to the first host, and
      a second indication signal generated by the first host in response to the input operation of the input device on the third display area is communicated through the first upstream port to the third downstream port to the second bridge to the third upstream port and to the third host, so that the third host emulates the input operation on the third display area according to the second indication signal to generate a third operation result on the third display area.

5. An electronic device, comprising:
   a first host;
   a second host;
   a hub device, comprising:
      a first upstream port, connected to the first host;
      a second upstream port, connected to the second host;
      a first downstream port, connected to the first bridge and the first upstream port;
      a first bridge, connected between the second upstream port and the first downstream port; and
      a second downstream port, connected to the first upstream port and an input device;
   a display panel, having a first display area corresponding to the first host and a second display area corresponding to the second host; and
   a control device, connected to the display panel, the hub device, the first host and the second host, and configured to generate a setting message to set the first display area and the second display area;

wherein the first host is configured to:
receive the setting message through the control device to obtain a display setting relationship of the first display area and the second display area,
generate a first operation result on the first display area according to an input operation of the input device on the first display area, wherein input operation of the input device on the first display area is communicated from the input device through the second downstream port to the first upstream port and to the first host, and
generate and transmit a first indication signal to the second host according to an input operation of the input device on the second display area, wherein the input operation of the input device on the second display area is communicated from the input device through the second downstream port to the first port and to the first host, and the first indication signal is communicated through the first upstream port to the first downstream port to the first bridge to the second upstream port and to the second host, so that the second host emulates the input operation on the second display area according to the first indication signal to generate a second operation result on the second display area.

6. The electronic device as claimed in claim 5, wherein the input device comprises a mouse, a keyboard, a touch plate, or a combination thereof.

7. The electronic device as claimed in claim 5, wherein the hub device is a universal series bus hub, and the first upstream port, the second upstream port, the first downstream port and the second downstream port are respectively a universal series bus connector.

8. The electronic device as claimed in claim 5, further configured such that:
the first host further determines whether a position of the input operation enters the second display area from an edge of the first display area;
the first host continues generating the first operation result on the first display area according to the input operation of the input device on the first display area in response to the input operation not entering the second display area from the edge of the first display area; and
the first host discontinues generating the first operation result and transmits the first indication signal to the second host through the first bridge in response to the input operation entering the second display area from the edge of the first display area.

9. The electronic device as claimed in claim 8, further configured such that:
the second host further determines whether the position of the input operation enters the first display area from an edge of the second display area;
the second host continues emulating the input operation on the second display area to generate the second operation result on the second display area in response to the input operation not entering the first display area from the edge of the second display area; and
the second host discontinues generating the second operation result and transmits a notification signal to the first host through the first bridge in response to the input operation entering the first display area from the edge of the second display area.

10. The electronic device as claimed in claim 5, further comprising:
a third host
a third upstream port, connected to the third host;
a third downstream port, connected to the first upstream port; and
a second bridge, connected between the third upstream port and the third downstream port;
wherein the display panel further has a third display area;
wherein the control device is further connected to the third host, and the control device is further configured to set the third display area corresponding to the third host; and
wherein the first host is further configured to:
generate and transmit a second indication signal to the third host according to an input operation of the input device on the third display area, wherein the second indication signal is communicated through the first upstream port to the third downstream port to the second bridge to the third upstream port and to the third host, so that the third host emulates the input device on the third display area according to the second indication signal to generate a third operation result on the third display area.

11. The electronic device as claimed in claim 10, further configured such that:
the first host further determines whether a position of the input operation enters the third display area from an edge of the first display area;
the first host continues generating the first operation result on the first display area according to the input operation of the input device on the first display area in response to the input operation not entering the third display area from the edge of the first display area; and
the first host discontinues generating the first operation result and transmits the second indication signal to the third host through the second bridge in response to the input operation entering the third display area from the edge of the first display area.

12. The electronic device as claimed in claim 11, further configured such that:
the third host further determines whether the position of the input operation enters the first display area from an edge of the third display area;
the third host continues emulating the input operation on the third display area to generate the third operation result on the third display area in response to the input operation not entering the first display area from the edge of the third display area; and
the third host discontinues generating the third operation result and transmits a notification signal to the first host through the second bridge in response to the input operation entering the first display area from the edge of the third display area.

13. An operation method of a display device, comprising:
using a first upstream port of a hub device to connect to a first host;
using a second upstream port of the hub device to connect to a second host;
using a first bridge of the hub device to connect to the second upstream port;
using a first downstream port to connect to the first bridge and the first upstream port;
using a second downstream port to connect to the first upstream port and an input device;
using a control device to connect to the hub device, the first host and the second host, and setting, by the control device, a first display area corresponding to the first host and a second display area corresponding to the second host to generate a setting message;

using a display panel to connect to the control device, so as to display the first display area and the second display area;

receiving the setting message at the first host through the hub device, so as to obtain a display setting relationship of the first display area and the second display area;

receiving, by the first host, an input operation of the input device on the first display area through the second downstream port and the first upstream port;

generating, by the first host, a first display result on the first display area according to the input operation of the input device on the first display area;

receiving, by the first host, the input operation of the input device on the second display area through the second downstream port and the first upstream port;

generating, by the first host, a first indication signal according to the input operation of the input device on the second display area; and transmitting the first indication signal to the second host through the first upstream port, the first downstream port, the first bridge and the second upstream port, so that the second host emulates the input operation on the second display area according to the first indication signal to generate a second operation result on the second display area.

14. The operation method of the display device as claimed in claim 13, wherein the input device comprises a mouse, a keyboard, a touch panel, or a combination thereof.

15. The operation method of the display device as claimed in claim 13, wherein the hub device is a universal series bus hub, and the first upstream port, the second upstream port, the first downstream port and the second downstream port are a universal series bus connector.

16. The operation method of the display device as claimed in claim 13, further comprising:
determining whether a position of the input operation enters the second display area from an edge of the first display area;
continuing to generate, by the first host, the first operation result on the first display area according to the input operation on the first display area in response to the input operation not entering the second display area from the edge of the first display area; and
discontinuing, by the first host, the generation of the first operation result and transmitting the first indication signal to the second host through the first bridge in response to the input operation entering the second display area from the edge of the first display area.

17. The operation method of the display device as claimed in claim 16, further comprising:
determining whether the position of the input operation enters the first display area from an edge of the second display area;
continuing to emulate, by the second host, the input operation on the second display area to generate the second operation result on the second display area in response to the input operation not entering the first display area from the edge of the second display area; and discontinuing, by the second host, the generation of the second operation result and transmitting a notification signal to the first host through the first bridge in response to the input operation entering the first display area from the edge of the second display area.

18. The operation method of the display device as claimed in claim 13, further comprising:
using a third upstream port of the hub device to connect to a third host;
using a second bridge of the hub device to connect to the third upstream port;
using a third downstream port of the hub device to connect to the second bridge and the first upstream port;
setting, by the control device, a third display area corresponding to the third host;
receiving, by the first host, the input operation of the input device on the third display area through the second downstream port and the first upstream port;
generating, by the first host, a second indication signal according to the input operation of the input device on the third display area; and
transmitting the second indication signal being transmitted to the third host through the first upstream port, the third downstream port, the second bridge and the third upstream port, so that the third host emulates the input operation on the third display area according to the second indication signal to generate a third operation result on the third display area.

19. The operation method of the display device as claimed in claim 18, further comprising:
determining whether a position of the input operation enters the third display area from an edge of the first display area;
continuing to generate, by the first host, the first operation result on the first display area according to the input operation on the first display area in response to the input operation not entering the third display area from the edge of the first display area; and
discontinuing, by the first host, the generation of the first operation result and transmitting the second indication signal to the third host through the second bridge in response to the input operation entering the third display area from the edge of the first display area.

20. The operation method of the display device as claimed in claim 19, further comprising:
determining whether the position of the input operation enters the first display area from an edge of the third display area;
continuing to emulate, by the third host, the input operation on the third display area to generate the third operation result on the third display area in response to the input operation not entering the first display area from the edge of the third display area; and
discontinuing, by the third host, the generation of the third operation result and transmitting a notification signal to the first host through the second bridge in response to the input operation entering the first display area from the edge of the third display area.

* * * * *